United States Patent [19]

Peppers

[11] Patent Number: 4,532,614
[45] Date of Patent: Jul. 30, 1985

[54] WALL BORE ELECTRICAL GENERATOR

[76] Inventor: James M. Peppers, P.O. Box 13278, 1026 Plover La., Arlington, Tex. 76013

[21] Appl. No.: 269,427

[22] Filed: Jun. 1, 1981

[51] Int. Cl.³ .............................................. G01V 1/40
[52] U.S. Cl. ...................................... 367/81; 367/83; 340/853; 324/369
[58] Field of Search .................. 367/82, 83, 81, 84, 367/911; 340/853, 854, 856; 324/369, 373, 356; 455/40; 175/48, 50

[56] References Cited

U.S. PATENT DOCUMENTS

| Re. 30,055 | 7/1979 | Claycomb | 367/84 |
|---|---|---|---|
| 2,181,601 | 11/1939 | Jakosky | 324/369 |
| 3,315,224 | 4/1967 | Ferguson | 340/853 |
| 3,638,106 | 1/1972 | Cram | 324/351 |
| 3,831,138 | 8/1974 | Rammner | 367/81 |
| 3,889,228 | 6/1975 | Shawhan | 367/82 |
| 4,015,234 | 3/1977 | Krebs | 367/81 |
| 4,057,781 | 11/1977 | Scherbatskoy | 340/853 |
| 4,087,781 | 5/1978 | Grossi et al. | 340/854 |
| 4,181,014 | 1/1980 | Zurela et al. | 340/856 |
| 4,184,545 | 1/1980 | Claycomb | 175/48 |
| 4,319,240 | 3/1982 | Stone et al. | 340/856 |

OTHER PUBLICATIONS

McDonald et al., "Borehole Telemetry System is Key to Continuous Downhole Drilling Measurements," 9/15/75, *Oil and Gas Journal*, pp. 111–118.

*Primary Examiner*—Nelson Moskowitz
*Assistant Examiner*—Ian J. Lobo
*Attorney, Agent, or Firm*—James E. Bradley

[57] ABSTRACT

Discloses a well bore electrical generator for a subsurface measuring system incorporating a rotary liquid seal protection system adapted to be actuated by flow of drilling mud through the drill pipe. System includes a sealed housing defining a first chamber separated from a second chamber with the chambers being filled with a sealing liquid. A rotatable shaft driven by an impeller extends from outside the housing into the first chamber through a rotary seal connected to establish a liquid seal between the housing and the shaft. Means are provided for maintaining the fluid pressure of the sealing liquid within the chambers to be equal to the fluid pressure of the drilling mud outside the housing. A rotatable pump connected to the shaft is adapted to pump the sealing liquid from the second chamber into the first chamber. A liquid pressure regulator is connected to regulate a return flow of sealing liquid from the first chamber to the second chamber and control the fluid pressure of the sealing liquid applied to the rotary seal from inside the first chamber to be greater than the fluid pressure applied to the rotary seal by the drilling mud from outside the housing.

12 Claims, 8 Drawing Figures

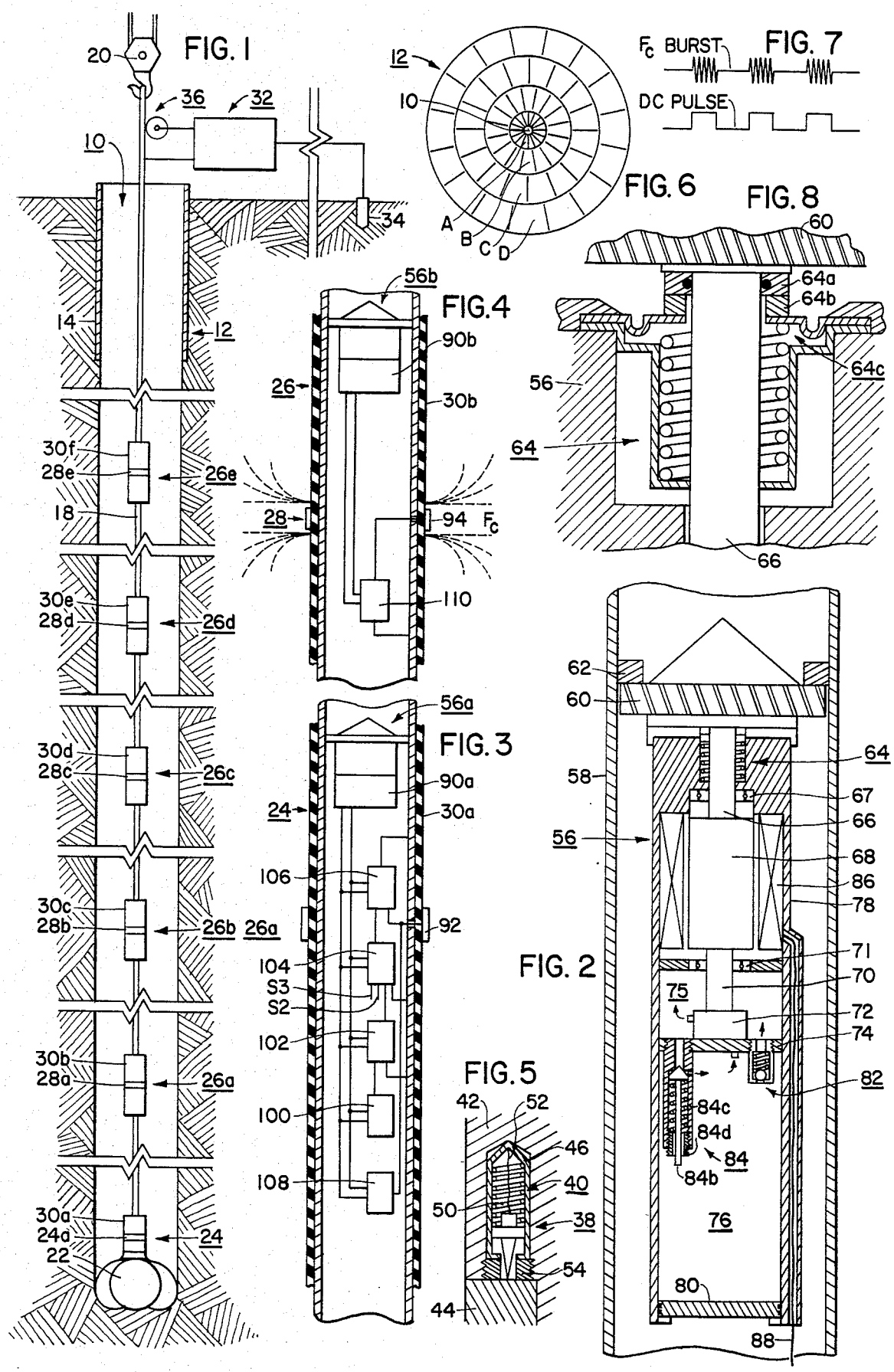

WALL BORE ELECTRICAL GENERATOR

This invention generally pertains to logging within well bores drilled into earth formations and more particularly pertains to telemetry apparatus and method for measuring while drilling with a portion of the apparatus being component parts of a drilling string.

BACKGROUND OF THE INVENTION

Many approaches have been taken to measuring while drilling or logging while drilling. Most approaches have utilized pulsing or vibrating the drilling mud column within the drill pipe for signal transmission.

One known approach to transmitting signals from the well bore bottom to the earth's surface electrically is disclosed in U.S. Pat. No. 4,057,781. This U.S. Pat. No. 4,057,781, which discloses a system herein referred to as the "cascade" communication system, is herein specifically incorporated by reference for its background information.

A problem with subsurface telemetry has been that, in large part, batteries are required to operate the detection and transmission circuitry at the bottom of the well bore and also for relaying intermittant signals from places along the drilling string such as in the cascade system above referenced. Batteries are prone to become much less efficient and finally inoperative at temperatures in excess of about 300° F. and, at present, no batteries are commercially available which are operable for any appreciable length of time in some hot, deep wells.

In some of the prior art, downhole electrical power generators have been provided which have performed satisfactorily so long as such generators remained in operable condition. A big problem encountered in the dowhole generators is keeping the mud out of the generator proper. Also, with some of the generators which have operated in an oil bath, the fluid seals separating the oil from the surrounding drilling mud have deteriorated rapidly due to the abrasive qualities of the drilling mud and, once the drilling mud has leaked into the generator, the generator usually becomes inoperative due to bearing failure and the like.

The impeller driven power generator as disclosed for use in the present invention is also an improvement over known power generators which have been employed for use within drill pipe. The present power generator is adapted to run continuously for many hours with no mechanical deterioration other than the normal wear and tear on its impeller blades.

OBJECTS OF THE INVENTION

An object of the present invention is to provide ample electrical energy as required at the bottom of the well bore for the detection and measurement apparatus and anywhere along the drilling string as required for signal relay stations as disclosed in the present invention, all without the need of batteries and all capable of performing at all the elevated temperatures at which the current state-of-the-art capacitors, rectifiers, transformers, insulation and the like will operate.

The electrical power within the well bore is produced by one or more improved electrical generators adapted for long term and continuous use under high temperature and high pressure. Each generator incorporates the combination of a rotary liquid seal protection means adapted to be actuated by the flow of drilling mud against a rotatable impeller. The combination includes a sealed housing defining a first chamber separated from a second chamber with these chambers being filled with a sealing liquid. A rotatable shaft is connected to the impeller and extends from outside the housing into said first chamber through a rotary seal means connected to establish a liquid seal between the housing and the shaft. A pressure equalizing means is provided for maintaining the fluid pressure of the sealing liquid within the housing and the chambers to be equal to the fluid pressure of drilling mud outside the housing. A rotatable pump means connected to the shaft pumps the sealing liquid from the second chamber into the first chamber when rotated. A liquid pressure regulating means is connected to regulate a return flow of sealing liquid from the first chamber into the second chamber and thereby controls the fluid pressure of the sealing liquid applied to said rotary seal means from within the first chamber to be greater than the fluid pressure of the drilling mud applied to the rotary seal from outside the housing.

BRIEF DESCRIPTION OF THE DRAWING

FIG. 1 is a schematic illustration of the present invention as incorporated in a drill string between a drill bit at the bottom of a well bore and the traveling block hook of a drilling rig at the earth's surface;

FIG. 2 is a schematic, partial cross-sectional representation of the power generator of the present invention mounted within the drilling string for actuation by drilling mud flow through the string;

FIG. 3 is a schematic representation of the detection and transmission portion of the present invention as will be mounted immediately above the drilling bit shown in FIG. 1;

FIG. 4 is a schematic typical representation of the various signal relay stations shown in FIG. 1 with each signal relay having its own power generator and signal receiving and transmitting system as shown;

FIG. 5 is a schematic cross-sectional view of the pin end of a drill pipe tool joint screwed into the box end of a drill pipe tool joint with a device for insuring good electrical connection between the joints of every section of drill pipe of the drilling string shown in FIG. 1;

FIG. 6 is an illustrative and typical horizontal coss-sectional view of the earth formation surrounding the drilling string and well bore at each of the current electrodes shown in FIG. 1; and FIG. 7 is a curve illustrating a typical DC digital signal along with corresponding bursts of AC current as described in the specification; and FIG. 8 is an enlarged view of the seal assembly 64 shown in FIG. 2.

DESCRIPTION OF A PREFERRED EMBODIMENT

Referring now to FIG. 1, there is shown a well bore 10 drilled into an earth formation and filled with a drilling fluid or mud of some electrical resistivity. The upper portion of the well bore 10 has installed therein a length of surface pipe 14 which may extend into the bore a distance of from 300–1,000 feet, for example. Located in operating position within the well bore 10 is a drilling string which includes many lengths of drill pipe 18 extending from rotary drilling apparatus (not shown) including a rotary table, mud pumps, mud pit and a travel block 20.

At the bottom of the well bore 10 is situated a rotary drill bit assembly 22 which includes the bit and a varied number of drill collars for stabilizing the bit and providing weight on the bit.

Mounted as part of the drill collars of the bit assembly 22, or immediately above the drill collars, is a detection and transmission station 24, which is better shown in FIG. 3. Mounted above the detection station 24 along the length of the drilling string 16 and connected together by many lengths of drill pipe 18 may be one or more signal relay stations illustrated as 26a, 26b, 26c, 26d, 26e, etc. A typical illustration of such relay stations 26a–26e is better illustrated in FIG. 4.

Schematically illustrated about midway of each of the transmission station 24 and the signal relay stations 26a–26e is a receiver/transmitter electrode identified in FIG. 1 as 24a beginning with the detection station 24 and as 28a–28e through each of the signal relay stations 26a–26e as shown.

The electrodes 24a and 28a–28e are seen to be electrically isolated from the ends of the respective stations by means of insulation sheath or jackets 30a–30f which surround the metallic portion of the drill string 16 to insulate the electrode appearing outside in electrical connection with the earth formation 12 from the metal of the drill pipe of the drilling string. These jackets, illustrated as 30a through 30f in FIG. 1, may be provided of abrasion resistant rubber, such as used in truck tires or inflatable well bore packers, or may be provided of a laminate of fiberglass which has been used to insulate similar mandrils in the prior art. A typical insulating jacket 30 is better shown in FIGS. 3 and 4.

At the top of the drilling string 16 at the earth's surface, a receiver/processor unit 32 is provided with connection to the drilling string 16 as shown and to a receiver electrode 34 as shown. As later described, the receiver electrode 34 will generally be mounted with good electrical connection established into the earth formation 12 at a position spaced apart from the metal parts of the drilling rig and drilling string at distances of from 100–1,000 feet or more, for example.

A depth measurement device 36 is schematically shown in connection from the receiver 32 to the drilling string 16 to provide an indication of depth measurement into the receiver. Other devices (not shown) such as torque measurement, drilling weight on the bit, mud weight, and the like may also be provided as desired. The appropriate system within the receiver/processor 34 may be any of those commercially available as needed to process the signals brought into the receiver from both downhole and the drilling floor.

Referring now to FIG. 5, there is shown a scoring or wiping device 38 which may be provided at every threaded connection or the drilling string between the joints of drill pipe 18 from the drill bit 38 to the electrical connection of the receiver 32. The purpose of the wiping device 38 is to provide better electrical connection at each screwed joint. In making up of the screwed joints of a drilling string, there is usually employed a lubricant to facilitate the threading and unthreading of each joint with minimal wear and galting. This lubricant sometimes may be of an insulating character such that the resultant electrical connection from one section of drill pipe 18 to the next or between any other threaded joint is not very good. And, as will become apparent from the overall concept of the present invention, good electrical continuity through the drilling string 16 is very helpful.

Referring now to FIG. 5, there is shown a cartridge 40 inserted into a hole defined into the make-up face of the pin end 42 of a drill pipe tool joint. As shown, the pin end 42 is screwed into assembled relation with the box end 44 of another drill pipe tool joint such that the make-up face of the box end 44 is flush into contact with the corresponding face of the pin end 42.

The cartridge 40 may include a casing 46 which terminates at one end as a point in good electrical connection within the pin end 42 and at its other end in a ferrule which retains within the casing a spring biased contact pin 48. The point of the contact pin is in scratching relation with the make-up face of the box end 44. The other end of the contact pin 48 is supported by a spring 50 into forceful extended position against the make-up face of joint 44 and a lead 52 may connect the other end of the contact pin 48 with the shell of the casing 46.

The purpose of the contact pin 48 is to wipe or otherwise make very forceful contact with the make-up of the box end 44 such that any grime, rust, or grease is scraped, scratched, and cleaned away with the metal of the pin 48 being in good electrical connection with the make-up face of the box end 44. To prevent wear to the conical end of the pin 48, the pin may be provided of hardened berillium copper or the like for example. The casing 46 is retained within the hole in pin end 42 by a means of a retainer bushing 54, for example. Alternately, the casing may simply be pressed into the hole as drilled on site with a hand drill, or the like.

Referring now to FIG. 2, there is shown a typical power generator 56 mounted within a section of pipe 58. The typical generator 56 in FIG. 2 is shown in FIG. 3 as generator 56a and in FIG. 4 as generator 56b respectively housed within pipe 58a and 58b as shown.

Generator 56 is generally comprised of an impeller section 60 which may or may not have straightening vanes 62 as shown. The impeller 60 is connected through a seal bellows or diaphram assembly 64 by means of a shaft 66 to a generator rotor 68. The rotor 68 is connected through a shaft 70 into connection with an oil pump 72. Adjacent to the oil pump 72 is a bulkhead 74 which separates housing 78 into an oil chamber 75 and an oil reservoir chamber 76. As shown, the seal assembly 64, shaft 66, rotor 68, shaft 70, oil pump 72, the bulkhead 74 and the oil reservoir 76 are all within a sealed housing 78. Defining a movable bulkhead at one end of the oil reservoir 76 is a free floating piston 80 which will transfer any pressure to within housing 78 as exists outside the housing. The piston 80 could be a bellows diaphragm or the like.

As shown, the shaft 66 is supported within the housing by means of a ball bearing 67 and the shaft 70 is supported within the housing by means of a ball bearing 71. The bearings 67 and 71 are recommended to be heavy duty such as commercially available.

The seal assembly 64, as shown in FIG. 8, comprises a seal ring 64a attached to the shaft 66 which is maintained in close sealing engagement with a seal ring 64b which is biased against the ring 64a by means of a bellows and spring 64c with the ring 64b being longitudinally movable but restrained from rotation by its mounting with the housing 78. The seal assembly 64 may be any of those selected from the numerous commercially available bellows or diaphram type seals such as, for example, used with externally driven refrigeration compressors, and modified as necessary to be mounted within the confines of the housing 78. Also, the pump 72 may be of the common gear type such as provided to circulate the oil in automobile engines, for example.

The chamber 75 is separated from the reservoir 76 by the bulkhead 74. The inlet of the pump 72 is connected into the oil reservoir 76 and the outlet of the pump is opened into the chamber 75.

Mounted also into the bulkhead 74 may be a spring biased ball check valve assembly 82 and an adjustable regulator valve assembly 84.

As can be seen, the regulator valve is comprised of a housing 84a into which is mounted a poppet valve 84b which is biased into closed position by spring 84c. The stem of the poppet valve 84b extends through an adjustment bushing 84d which is threaded into the housing 84a. As shown, the bushing 84d may adjust the compressive tension in the spring 84c such that a predetermined pressure must exist within the chamber 75 before the valve will open and relieve any pressure thereover.

The purpose of the ball check valve 82 is to permit ready entrance of oil from the chamber 76 into the chamber 75 as the generator unit is being filled with oil. The floating piston 80 retains oil within the oil reservoir 76 at a pressure which is the same as the pressure outside the housing 78 such as the drilling mud fluid pressure. The generator rotor 68 is mounted within stator coils 86 which are connected through an electrical conductor 88 into a power supply system 90, shown as 90a and 90b respectively in FIGS. 3 and 4.

The power supply system 90, shown as 90a and 90b in FIGS. 3 and 4, may be conventional and comprised of appropriate transformers, rectifiers, and capacitors in connection to produce steady flow direct current of one or more values as needed during all the time that the generator assembly 56 is being rotated by the high pressure drilling mud.

In operation, the generator assembly 56 is assembled as shown, completely filled with oil and mounted within the pipe 58 as shown. When mud is pumped through the pipe 58, the impeller section 62 is rotated by the mud and, through shaft 66, turns generator rotor 68, shaft 70 and oil puump 72. Alternating current voltage will be produced by rotation of the rotor 68 which is transmitted through the electrical connector 88 into power supply 90.

Rotation of the pump 72 by the impeller 60 brings oil from the reservoir 76 and delivers the oil under pressure into the chamber 75. At a designated setting of the regulator valve assembly 82, for example, 75 pounds to 125 pounds, the valve opens and allows oil to bleed back into the reservoir 76 and thereby maintain the pressure within the chamber 75 at the designated setting above the pressure outside the housing 78 and within the pipe 58. This increased pressure within the chamber 75 is continuously exerted across the faces 64a and 64b of the seal assembly 64 during operation of the generator.

As is commonly known in the seal art, such pressure differential allows very small amounts of oil to migrate or seep between the faces of the seal during their relative rotation which serve to keep the seal faces lubricated and to continually flush clean any debris or detritus as might be found outside the housing 78, namely the particulate material found in drilling mud. The amount of oil migrating between the faces of the seal member 64a and 64b is very small such that the generator assembly 56 may be operated hundreds of hours, for example, without appreciable use of oil from the oil reservoir 76.

Referring now to FIG. 3, the detector transmission station 24 is seen to have mounted about the outside of the insulating jacket 30a a sensor/transmitter electrode 92. Shown in FIG. 4 outside the insulating jacket 30b is a similarly functioning receiver/transmitter electrode 94.

In FIG. 3, the power supply 90a is seen to supply power voltage as required to a sensing element 100, an analog to digital (A/D) converter 102, a multiplexing (MX) system 104, a digital to frequency converter (D/f) transmitter 106, and a receiver element 108.

The sensing element 100 may be a system including a thermocouple, a radioactivity detector, a torque measurement circuit, an inclination/azimuth system, or such other detection units as may be chosen for use with the present invention.

The output of the sensing element 100 normally may be a DC analog signal which is passed into the A/D converter 104 where it is converted and transmitter out as a binary digital pulse signal, for example, with a pulse repitition rate and pulse duration as best suited for the system as later described.

The digital output from A/D converter 102 is passed into multiplex (MX) system 104 along with possible signals from other sensing elements through the connectors $S_2$ and $S_3$, for example. In the event that the sensing element 100 is the only sensing element in use, then the MX system may be bypassed or eliminated.

The output from the MX system 104, which may include the output of A/D converter 102 along with similar converters from other sensing elements, is passed into the D/f converter and transmitter 106.

In converter 106, the digital input is transformed into an output which are a series of bursts of AC current of designated frequency with each burst being in phase and synchronism with a corresponding digital pulse received from A/D converter 102. The output of the D/f converter 106 is passed out of the electrode 92 into the surrounding earth formation as shown in FIGS. 1 and 4. The voltage from D/f converter 102 and the current eminating through electrode 92 may be of focussed character represented by the curve Fc in FIG. 7.

While an amplified DC binary digital pulse could be used in lieu of the converted D/f signal as shown in FIG. 7, it will become apparent that use of a DC signal may be limited and is recommended only when its use is obviously suitable. The function of the receiver element 108, which is also connected to the electrode 92, will be described later in connection with another function of the system.

In FIG. 4, there is shown a receiver/transmitter 110 connected to the receiver/transmitter electrode 94. The receiver 110 is supplied with power from the power supply 90b.

In operation, the receiver transmitter 110 receives bursts of AC voltage at frequency $F_1$, for example, and transmits a signal back out through the electrode 94 at a frequency of $F_2$, for example, with each burst corresponding in duration to the AC bursts received at frequency $F_1$.

The dashed lines in FIG. 4 illustrate generally the radial path of the current through electrode 94, generally identified as focussed current Fc which is guided or focussed on its either side by a portion of the current.

As will be later explained in more detail, FIG. 6 generally shows the pattern of the current Fc as it eminates in radial fashion away from the well bore 10.

As previously mentioned, the output of the D/f converter 106 may be of a frequency $F_1$ and the output of the receiver transmitter 110 may be of a frequency $F_2$.

As seen in FIG. 1, the $F_1$ frequency which eminates through the electrode 92 is the frequency of the current in the earth formation 12 between the electrode 92 and the current passing between the electrodes 28a and 28b is of frequency $F_2$ as generated by transmitter 110. It is seen further that the current passing between the electrodes 28d and 28e, the electrodes 28c and 28d, the electrodes 28d and 28e and the electrodes 28e and the receiver electrode 34 may be of alternate frequencies $F_1$ and $F_2$.

The reason for these two frequencies is that the frequency $F_1$ of the current between electrodes 92 and 28a will be of sufficient magnitude to permit detection of a potential at the electrode 28a but not sufficient to produce a measurable potential between the electrode 92 and electrode 28b. If the signal $F_1$ were of sufficient magnitude to be measured at electrode 28b, then the signal relay station 26a would be unnecessary. The spacing between the signal relay stations is such that the voltage of a given frequency will pass current through the earth formation between the electrodes and the stations are to be spaced apart along the drilling string the maximum distance that potential may be measured.

In the absence of visualizing the present system from the viewpoint of measuring small potentials such as generated by the currents provided in the electrical logging or prospecting logging arts, one would surmise the current from the electrode 92 would immediately complete its circuit by shunting directly to the drill string 16 just above the transmission station 24. Of course some such current through electrode 94 is shunted through the drilling mud and immediate formation to the drill string 16, but not all of such current.

The current is focussed laterally and radially away from the axis of the well bore by the tendency of the current to radiate outwardly from the well bore in a manner somewhat as illustrated in FIG. 6.

Of course the current which is to be used, ie, the current Fc, is focussed laterally out into the formation for a considerable distance away from the bore hole by the focussing action of a portion of the current. Gradually, the combined current blooms out from the respective current electrode in the form of a spherical shape which will be skewed at top and bottom by the shunting action of the drilling mud, if it is sufficiently conductive, to the drill pipe of drilling string 16.

However, when the current is displaced farther from the well bore, the greater the volume of earth formation, or in FIG. 6 the greater area of formation, is available for current flow.

It is important to note that the portion of the electrical current which is radially directed some distance away from the bore hole thereafter encounters less effective resistance than would be encountered if returning to the drilling string 16. This inherent physical characteristic is the basis from which the present invention is structured.

For purposes of illustration only, FIG. 6 as shown may be divided into zones A, B, C, and D of increasing annular area. Assuming the formation 12 as shown in FIG. 6 to be of disc shape of constant thickness and constant resistivity, it is readily seen that the resistivity of the volume of zone A would provide a given resistance to a designated flow of electrical current. As can be seen, the zone B is of much greater volume for the same current flow with corresponding less effective electrical resistance. In turn, zone C is of yet much greater volume and corresponding lesser effective resistance to current flow than zone B, and zone D on out becomes far greater in volume with far less effective resistance to the same current flow.

In the zones A-D and beyond, the formation volume available for current passage increases as a function of the radius squared on a plane and as to the radius cubed in a sphere.

Thus, after current is focussed and forced through zone A and zone B, for example, there is little or no effective resistance to that specific amount of current flow in the much larger volumes beyond. Such effective decrease in resistivity with increase in distance would appear to follow the equation of decrease of light intensity from a given source, or, the concept of an increasing number of resistors connected in parallel for each incremental zone of greater radius.

Thus, it is seen that the *effective* resistance to current flow, once the current has passed to a small distance away from the well bore, is exceedingly small and becomes smaller as the volume of earth formation increases for the same current to pass through.

Conversely, current coming back to pass through the zone immediately around the well bore to a particular point such as the electrode 94, or any point along the drill string 16 between the electrodes 92 and 94, meets with increasing affective resistance as the current comes toward the well bore.

Very little current is required to produce a measurable potential at electrode 94, for example, while a substantial amount of current would be required to completely shunt all the initial current flowing through the electrode 92 or the relay electrode 94.

Thus, it is seen that sufficient electrical current will pass through the earth formation to be available at the succeeding electrode 94 to produce a measurable potential even though some, or even most, of the current may be shunted to the drill string along its length.

Of course a great number of variables exist in the present array of apparatus as disclosed. The conductivity of the steel along the drill string may be assumed to be relatively constant.

The conductivity of the drilling mud in the well bore between the well bore annulus between the well bore walls and the drilling string may vary considerably depending on the nature of the mud. If the mud is of moderate to fairly high resistivity, then the system will work very well. If the mud is of extreme low resistivity such as with a high salt mud, then the conductivity may severely curtail the distance that the measurable potential can be measured and thereby reduce the distance between any of the electrode stations 26 shown in FIG. 1. If the drilling mud is highly resistive, such as with an oil base mud, then there may be considerable difficulty unless enough current can pass through the mud to expand out into the formation as previously described.

The varied resistivity of the earth formations, particularly at any appreciable distance from the well bore, is not considered to be a very substantial factor in the signal transmission of the present invention.

All the previously mentioned variables may be brought into much better perspective with employment, in a test well, of various drilling fluids, spacing of relay stations, signal current output from relay stations, surface electrodes, and the like to obtain reliable data.

OPERATION OF THE PREFERRED EMBODIMENT

In operation, the drilling string 16 is made up including the components of the present invention and run into the well bore 10 as shown. The mud pumps may then be started to force drilling mud down through the drilling string 16 at high pressure and high volume, utilizing several hundred horsepower in pumping, for example. At the minimum, the telemetry system will function with drilling stopped and with the mud being circulated in volume only sufficient to rotate the generators 56.

The generators 56 as mounted within the signal relay stations 26a–26e and the detector transmission station 24 are operating at all times that mud is being pumped through the well bore and are producing electrical power.

The electronic circuitry of the signal relay stations 26a–26e may be adapted to respond and produce a signal voltage only when a signal voltage is received from a preceeding station. The transmission station may be switched off and on to send signals, if such is desirable, as later described.

As the bit is rotating to drill additional depth in the well bore 10, the sensing element 100 produces a DC signal which is converted to a binary digital signal by the A/D convertor 102 and fed into the MX system 104 or directly into the D/f converter 106 if appropriate. The D/f converter converts the binary digital signal into corresponding bursts of alternating AC voltage of frequency $F_1$ which is passed as an AC current through the electrode 92 out into the earth formation 12.

It is to be noted that terms such as "focussing", "focussed", and the like, as used in the appended claims, shall mean the effective and resultant focussing of the signal current, or currents, as herein described.

The relay station 26a is spaced appropriately for detector/transmitter 110 to detect the alternating potential of frequency $F_1$ and convert it into bursts of amplified voltage of frequency $F_2$ which is passed out through the electrode 94. The spacing between the transmission station 24 and the relay station 26 will of course vary with the many variables previously mentioned.

The frequency of the $F_1$ is one factor. The conductivity of the drilling mud is another factor. The conductivity of all the surrounding formation and the mud filtrate encroached section of formation is a factor. The surface resistivity of the drill pipe of the intermediate part of the drilling string is yet another factor. All of these contribute to the variables which will need be assessed to make a general arrangement that will be useful in wells with a given drilling mud resistivity.

An increased surface resistivity of the drilling string is helpful to reduce power requirements and to reduce the necessary length of each jacket 30. Any kind of a coating on the drilling string is helpful, such as mill varnish, paint, or the like.

The system herein disclosed would operate ideally with more modest power requirements if the entire length of the drill string 16 were completely insulated, as by a plastic paint coating. However, it the plastic coating were initially provided, it would be worn off at the drill joints as well as being cut, scraped and nicked, to leave bare and conductive surfaces on the pipe during its handling in being made up and broken out during the many trips in and out of the well bore during the drilling operation.

The system of the present invention will be functional as a practical matter, however, with little or no surface insulation on the drill string 16, provided that sufficient power is made available and provided that the effects of the focus current is known to permit proper spacing of signal relay stations as may be required. The fact that tool joints throughout the drilling string are kept rubbed free of paint and/or any other type of coating is not particularly detrimental to the use of the present invention.

Through not very important, it is also pointed out that drill pipe which is slightly rusty will have a greater surface conductivity in drilling mud than drill pipe which is merely smooth and free of rust. It is thought that the rust catches electrolites from the drilling mud and forms a sort of conductive sponge electrode.

It is also pointed out that, if the transmission station 24 is located not too far below the surface pipe 12 (at the location of the relay station 26e, for example) then no intermediate signal relay station 26 is actually necessary.

The receiver/processor system 32 at the earth's surface actually receives its signal from the receiver electrode 34 through earth formation 12 with the drill pipe serving as the common conductor through the system. Thus, the current at frequency $F_1$ is passed through the formation 12 to form a potential between the transmitter electrode 24a and the receiver electrode 34. This arrangement is the broadest aspect of the present invention.

As the hole is drilled deeper into the earth, additional signal relay stations 26 are added as needed. Each relay station may produce a signal of frequency different that its successor and also its follower. Of course the receiver/processor system 32 would need be switched to receive alternate frequencies $F_1$ and $F_2$ with the addition of each additional signal relay station.

In the fabrication of the present invention, it is anticipated that each relay station 26 will be of length primarily established by the necessary or desirable length of the insulating jacket 30. Exemplary lengths could be a distance of 15-30 feet on either side of the electrode array which would amount to about 30-60 feet or the length of one or two joints of drill pipe. The next convenient length for the signal relay station would be equivalent to three joints of drill pipe or approximately 90 feet long which would give a better isolating affect for the action of the current electrodes 92 and 94, as previously described.

It is also suggested that the spacing between the transmitter station 24 and the first relay station 26a (or between the relay stations 26) be great enough that no more than an adequately measurable potential can be produced at the appropriate sensing electrode. Should this potential be high enough to co-mingle with the next potential along the drilling string of same frequency, then the stations may have their detection sensitivity levels adjusted accordingly or be spaced farther apart.

The principle reason that two frequencies are recommended rather than relaying the same frequency from station to station is that possible distortion in phase relation of the voltage frequencies or time relation of the digital pulse signal, or interference with the measured signal, may occur which would be undesirable. While the same frequency may be workable, the alternate frequencies are herein recommended to avoid any such distortion or complication.

Now, with the foregoing construction and operation explained, it is to be noted that signals may be transmitted down the hole from the earth's surface as well as up the hole from the sensing instrument, as previously described, with appropriate circuit provisions such as separate control frequencies.

In such instance, a transmitter would be provided to provide a signal through the receiver electrode 34 of appropriate frequency which may be picked up by the first relay station and transmitted successively down as described, through the various relay stations to the detector transmitter station 24. There, as shown in FIG. 3, such frequency may be received at electrode 92 and transmitted into the receiver 108, previously identified, and thereon converted into a DC pulse signal or analog signal as desired to affect switching, as may be needed in the downhole instrument, or to effect calibration of a particular downhole instrument as presently performed in wireline logging tools of similar or equivalent nature. Reference to the wireline well logging art will provide additional information regarding this switching facility.

It is to be noted that the invention as herein described depends on an ample continuous and dependable power supply at the sensor transmitter station 26 and each of the signal relay stations 28 to be operable and successful. Accordingly, the provision of a reliable power supply 56, such as the power supply previously described, is of paramount importance. No known battery or batteries, are capable of providing such power while being packaged within the drilling string 16 or while operating at the high temperatures sometimes encountered.

The power supply 56 as herein described can provide such power for several hundred hours of operation without maintenance, and then with the only maintenance being the possible replacement of the impeller blades 60.

In summary, the most simple version of the present apparatus includes the drill string 16 as a common return conductor, the signal transmitter 106 connected to the drill string and through the transmitter electrode 92, the earth formation 12 to the receiver electrode 34, and the receiver 32 connected between the drill string and the receiver electrode to complete the circuit. The signal potential variation is transmitted through earth formation 12 with the drill string serving as a common electrical return. The signal current path through the formation is considered to be radially away from the electrode 92 for some distance, then up through earth formation 12 to receiver electrode 34.

In this version, with no intermediate signal relay station, the signal voltage through earth formation 12 may be any of: digital DC pulses; digital bursts of AC voltage of designated frequency; a continuous AC frequency modulated (FM) signal voltage; or possibly an AC amplitude modulated (AM) signal voltage.

At well depths where the received signal of the above described version becomes too attenuated to have integrity, one or more signal relay stations 26 are used as necessary.

With one relay station 26 employed, there are two signals transmitted through earth formation 12 with drilling string 16 serving as a common return. The signal from transmitter 24 is transmitted through earth formation 12 to recevier/transmitter 26a which then transmits a second signal to the receiver electrode 34. In the versions using one or more signal relay stations, the signal may be digital bursts of AC voltage of designated frequency for each signal.

While a continuous amplitude modulated (AM) AC voltage of designated frequency could be used theoretically in some instances within the concept of this invention, tests may show the AM signal to be less practical.

It has become apparent that the following factors are of substantial importance in the successful operation of the present invention:

(1) The power source or sources as provided for the system have to be sufficiently ample to provide the current as herein described;
(2) The insulating shields 30 provided at each transmitter or receiver electrode on the drill string 16 are necessary to allow direction or focussing of the current flow and to reduce the amount of current needed;
(3) The inherent current focussing action as herein described with respect to electrodes 92 and 94 is necessary;
(4) The current passing through the transmitter electrodes, such as electrodes 92 and 94, may be set at a designated level for stable operation and to permit better forcasting of the spacing needs between the transmitter 24 and relay stations 26 or the transmitter 24 and the surface receiver electrode 34;
(5) The receiver electrode 34 should be spaced sufficiently apart from the drilling string 16 at the earth's surface to minimize any interference or noise as may be caused by the various interacting metal parts of the drilling equipment and surface pipe 14.

In summary, it is seen that a new and novel arrangement is herein shown and described which will transmit signals of integrity from any depth in the well where temperatures will permit operation of presently available electronic components and at greater temperatures than where batteries can be functional.

Further, there is no inherent attenuation of the signal mud pulses and no wear and tear of mechanical components as found in a mud pulse system. The wear in the present system is confined only to the blades of the generator impellers. Since no great power is transmitted by these impellers as with turbine drilling impellers, the wear on the impellers will not be near as great, and, even if the wear is considerable, they can be replaced conveniently at any time that the drilling string is withdrawn from the hole.

It will be evident that various refinements to the present embodiment as disclosed will become obvious to one skilled in the art, and that various modifications and refinements can be made to the present embodiment as disclosed, all without departing from the spirit of the invention as outlined in the following claims.

I claim:

1. In combination with measuring while drilling electrical power generator, a rotary liquid seal protection means adapted to be actuated by the flow of drilling mud through a drill string, comprising:
    (a) a sealed housing defining a first chamber separated from a second chamber;
    (b) said chambers being filled with a sealing liquid;
    (c) a rotatable shaft extending from outside said housing into said first chamber through a rotary seal means connected to establish a liquid seal between said housing and said shaft;

(d) pressure equalizing means for maintaining the fluid pressure of said sealing liquid within said housing and said chambers to be equal to the fluid pressure of the drilling mud outside said housing;

(e) a rotatable pump means connected to pump said sealing liquid from said second chamber into said first chamber when rotated by said shaft;

(f) a liquid pressure regulating means connected to regulate a return flow of sealing liquid from said first chamber to said second chamber and to control the fluid pressure of the sealing liquid applied to said rotary seal means from within said first chamber to be greater than the fluid pressure of the drilling mud applied to said rotary seal means from outside said housing; and (g) an impeller means mounted to said shaft exterior of said housing and adapted to rotate said shaft when rotated by the flow of said drilling mud past said housing.

2. The combination of claim 1 wherein said pressure regulating means comprises a selectively biased poppet valve means.

3. The combination of claim 1 wherein said rotary seal means is of the face type.

4. The combination of claim 1 wherein an electrical generator is mounted within said first chamber and adapted to be rotatably driven by said shaft.

5. The combination of claim 1 wherein said pressure equaliziang means comprises spring biased check valve means communicating between said chambers.

6. The combination of claim 5 wherein said pressure compensation means includes a floating piston disposed in said second chamber between said drilling mud and said sealing liquid.

7. The combination of claim 1 wherein said pump means comprises a gear type pump.

8. An impeller driven electrical power generator in combination with a rotary liquid seal protection means adapted to be actuated by the flow of drilling mud through a drill string, comprising:

(a) a sealed housing defining a first chamber separated from a second chamber;

(b) said chambers being filled with a sealing liquid;

(c) a rotatable shaft extending from outside said housing into said first chamber through a rotary seal means connected to establish a liquid seal between said housing and said shaft;

(d) said electrical power generator means being mounted within said housing and connected to be rotatably driven by said shaft;

(e) pressure equaliziang means for maintaining the fluid pressure of said sealing liquid within said housing and said chambers to be equal to the fluid pressure of the drilling mud outside said housing;

(f) a rotatable pump means connected to pump said sealing liquid from said second chamber into said first chamber when rotated by said shaft;

(g) a selectively biased liquid pressure regulating means connected to regulate a return flow of sealing liquid from said first chamber into said second chamber and to control the fluid pressure of the sealing liquid applied to said rotary seal means from within said first chamber to be greater than the fluid pressure of the drilling mud applied to said rotary seal means from outside said housing; and (h) an impeller means mounted to said shaft exterior of said housing and adapted to rotate said shaft when rotated by the flow of said drilling mud past said housing.

9. In combination with an impeller driven electrical power generator adapted to be actuated by the flow of drilling mud through a drill string, a rotary seal protection means comprising:

(a) a sealed housing defining a first chamber separated from a second chamber;

(b) said chambers being filled with a sealing liquid;

(c) a rotatable shaft extending from outside said housing into said first chamber through a rotary seal means connected to establish a liquid seal between said housing and said shaft;

(d) pressure equalizing means for maintaining the fluid pressure of said sealing liquid within said housing and said chambers to be equal to the fluid pressure of the drilling mud outside said housing;

(e) a rotatable pump means connected to pump said sealing liquid from said second chamber into said first chamber when rotated by said shaft;

(f) a selectively biased liquid pressure regulating valve means connected to regulate a return flow of sealing liquid from said first chamber into said second chamber and to control the fluid pressure of the sealing liquid applied to said rotary seal means from within said first chamber to be greater than the fluid pressure of the drilling mud applied to said rotary seal means from outside said housing; and (g) an impellar means mounted to said shaft exterior of said housing and adapted to rotate said shaft when rotated by the flow of said drilling mud past said housing.

10. The combination of claim 9 wherein an electrical generator is mounted within said housing and adapted to be rotatably driven by said shaft.

11. The combination of claim 9 wherein said pressure regulating means comprises a selectively biased poppet valve means.

12. The combination of claim 9 wherein said rotary seal means is of the face type.

* * * * *